United States Patent Office 3,185,679
Patented May 25, 1965

3,185,679
AZEPINE DERIVATIVES
Walter Schindler, Riehen, and Hans Blattner, Basel, Switzerland, assignors to Geigy Chemical Corporation, New York, N.Y., a corporation of Delaware
No Drawing. Filed Dec. 2, 1963, Ser. No. 327,507
Claims priority, application Switzerland, Dec. 6, 1962, 14,326/62
2 Claims. (Cl. 260—239)

This invention relates to new azepine derivatives with valuable pharmacological properties, as well as a process for the production thereof.

More particularly, this invention relates to a new iminodibenzyl type azepine derivative which is characterized by possessing substituents in the 7- as well as in the 10-position, and which is distinguished by an unexpected combination of pharmacological properties.

Compounds of the general formula

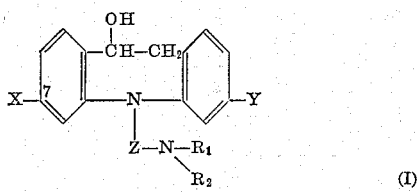

(I)

wherein

X and Y independently of each other represent hydrogen or chlorine,
Z represents a straight or branched chained alkylene radical with 2 to 4 carbon atoms,
$R_1$ represents a lower alkyl radical or a hydrogen atom, and
$R_2$ represents a lower alkyl radical, have not been known up to now. It has now been found that such compounds and their salts with inorganic or organic acids have valuable pharmacological properties, in particular reserpine-antagonistic, serotonin-antagonistic and anti-cholinergic activity, and are suitable, for example, for the treatment of mental disorders, particularly of depressions. They may be administered orally or, in the form of aqueous solutions of their salts, also parenterally.

Especially the compound falling under Formula I which possesses as sole substituents, apart from the hydroxyl group in 10-position, a chlorine atom in 7-position and the γ-dimethylaminopropyl radical in 5-position, is distinguished from other hydroxy- and chloro-substituted iminodibenzyls by its pharmacodynamic spectrum which contains a pronounced reserpine-antagonistic component with contributory serotonin-antagonistic and anti-cholinergic activities, while there is practically no antihistaminic component present. This compound is, therefore, especially indicated for use in the treatment of depressions where no accompanying calmative component in the spectrum of the active agent is desired.

This spectrum of the above-described 5-(γ-dimethylamino-propyl)-7-chloro-10,11-dihydro-5H - dibenz [b,f]-azepin-10(11H)-ol is particularly unexpected, since the corresponding 7-chloro-10-keto analog possesses only much weaker reserpine-antagonistic activity and practically no anti-cholinergic activity or no serotonin-antagonistic activity, but a considerable antihistaminic effect, while the 7-unsubstituted 10-keto analog possesses equally inferior reserpine-antagonistic activity as the 7-chloro-10-keto compound, also a much weaker serotonin-antagonistic property than the new 7-chloro-10-hydroxy-derivative, practically no anticholinergic activity, however, just as the 7-chloro-10-keto analog, a relatively strong antihistaminic component in its pharmacodynamic spectrum. It should also be noted that introduction of a methyl group in 10-position into the corresponding 7-chloro-5-(γ-dimethylamino-propyl)-10,11 - dihydro-5H-dibenz[b,f] azepine does, indeed, practically eliminate the antihistaminic component from the pharmacodynamic spectrum of the latter, but also, simultaneously, eliminates the beneficial serotonin-antagonistic effect of the latter and seriously reduces the anti-cholinergic activity to be found in the spectrum of the 10-unsubstituted 7(3)-chloro compound.

In the compounds of the general Formula I, X is, for example, hydrogen or a chlorine atom in the 7-position, and Y is hydrogen or a chlorine atom in the 3-position. Z is, for example, an ethylene, propylene, trimethylene or 2-methyl-trimethylene radical. Lower alkyl radicals $R_1$ and $R_2$ are preferably methyl radicals; further, for example, they can be ethyl, n-propyl, isopropyl, n-butyl or isobutyl radicals.

The new compounds of Formula I are produced by reducing a compound of the general formula

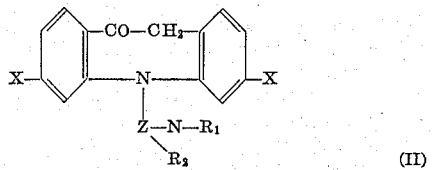

(II)

wherein X, Y, Z, $R_1$ and $R_2$ have the meanings given above.

The reduction of the carbonyl group in the 10-position to the hydroxy-methylene group necessitates an equimolar amount of hydrogen. For example, compounds of the general Formula II are reduced by means of a complex hydride, in particular lithium aluminum hydride, in an ether-type solvent such as diethyl ether, dibutyl ether, tetrahydrofuran or dioxan, or by means of sodium borohydride, for example in methanol, at room temperature or at a moderately raised temperature. Also, the compounds of Formula II can be reduced by means of catalytically activated hydrogen, for example, in the presence of Raney nickel under increased pressure and at a raised temperature in a lower alkanol or in dioxan as solvent, or in the presence of a noble metal catalyst such as palladium on charcoal or on an alkaline earth metal carbonate.

Starting materials of the general Formula II are known or can be produced in an analogous manner, as described, for instance, in French Patent 1,300,731, issued July 2, 1962, and in British patent application 943,277, published February 4, 1963.

They are produced by hydrolysis of compounds of the general formula

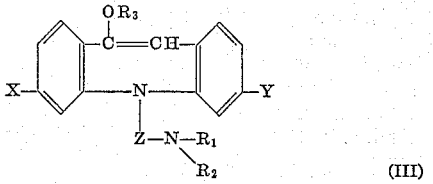

(III)

wherein $R_3$ represents a lower alkyl radical, and (X, Y, Z, $R_1$ and $R_2$ have the meanings given above, for example, by heating in dilute hydrochloric acid. Compounds of Formula III in which $R_1$ is not hydrogen can be produced by condensing by means of sodium amide or another active condensing agent, while heating in an inert organic solvent such as, for example, toluene, 10-alkoxy-5H-dibenz[b,f]azepines which may be substituted corresponding to the definition of X and Y, with dialkylaminoalkyl halides. Compounds having a hydrogen atom as $R_1$, are obtained from the above-mentioned reaction products by reacting them, for example, with a lower chloroformic acid alkyl ester or with phosgene, and hydrolyzing the resulting N-carbalkoxy or N-chlorocarbonyl compounds, for example, with an alkali metal hydroxide in ethylene glycol, diethylene glycol or with one of their lower monoalkyl ethers while heating.

The new compounds of Formula I form salts, some of which are water-soluble, with inorganic and organic acids such as hydrochloric acid, hydrobromic acid, sulfuric acid, phosphoric acid, methane sulfonic acid, ethane disulfonic acid, β-hydroxyethane sulfonic acid, acetic acid, lactic acid, oxalic acid, succinic acid, fumaric acid, maleic acid, malic acid, tartaric acid, citric acid, benzoic acid, salicylic acid, phenyl-acetic acid and mandelic acid.

Pharmaceutically acceptable salts, i.e. salts with acids which, in the necessary dosages, are pharmacologically harmless, can be used directly as active substances for pharmaceuticals for oral or parenteral administration. Salts with other acids are suitable, for example, for purposes of recrystallization in order to isolate and purify the new compounds.

To produce dosage units for peroral application, an active substance falling under Formula I or a salt thereof is combined, e.g. with solid, pulverulent carriers such as lactose, saccharose, sorbitol, mannite; starches such as potato starch, corn starch or amylopectin, also laminaria powder or citrus pulp powder, cellulose derivatives or gelatine; moreover, lubricants such as magnesium or calcium stearate or polyethylene glycol (Carbowaxes) of suitable molecular weights may be added, to form tablets or dragée cores. The latter are coated, for example, with concentrated sugar solutions which, e.g. contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other capsules consist, for example, of a mixture of gelatine and glycerine and contain, e.g. mixtures of the active substance or a suitable salt thereof with Carbowax. Hard gelatine capsules contain, for example, granulates of the active substance or a suitable salt thereof with solid, pulverulent carriers such as lactose, saccharose, sorbitol, mannite, starches such as potato starch, corn starch or amylpectin, cellulose derivatives or gelatine, as well as magnesium stearate or stearic acid. Suppositories are employed as dosage units for rectal application. These consist of a combination of the active substance or a suitable salt thereof with a neutral fatty base. Gelatine rectal capsules can also be employed which consist of a combination of the active substance or a suitable salt thereof with polyethylene glycols (Carbowaxes) of suitable molecular weight.

Ampoules for parenteral, particularly intramuscular application, preferably contain a water-soluble salt of the active substance of Formula I, suitable stabilizing agents and, if necessary, buffer substances in aqueous solution. Antioxidizing agents such as sodium bisulfite, sodium sulfite, ascorbic acid or rongalite (formaldehyde-sodium bisulfite compound) are suitable in particular as stabilizing agents either alone or combined, in concentrations between about 0.01 and about 0.5% calculated on the total weight of the mixture. Because of its ability to form chelates, ascorbic acid has an additional stabilizing effect; in this function it can also be replaced by other chelate-formers. The best stability of the active ingredient is attained, e.g. by mixtures in suitable ratio of sodium sulfite, sodium bisulfite and/or ascorbic acid, or by the addition of other buffer substances such as citric acid and/or salts thereof. In addition, the ampoules can contain a slight amount of a conventional preserving agent.

The following non-limitative examples further illustrate the production of new compounds falling under Formula I. The temperatures are in degrees centigrade. Grams are designated by (g.) and milliliters by (ml.).

EXAMPLE 1

A solution of 20 g. of 5-(γ-dimethylamino-propyl)-7-chloro-5H-dibenz[b,f]azepin-10(11H)-one (B.P.$_{0.03}$ 186–188°, M.P. 72–72.5° from pentane) in 300 ml. of anhydrous ether is added drop by drop within 30 minutes at 20° C. to a suspension of 2.5 g. of lithium aluminum hydride in 200 ml. of anhydrous ether. The reaction mixture is then refluxed for 8 hours. After cooling, unconsumed hydride is carefully decomposed with water. The resulting precipitate is separated and dissolved in hot benzene. After concentrating the benzene solution to about 100 ml. the carbinol crystallizes out, M.P. 146–147°. After recrystallizing once from benzene, pure 5-(γ-dimethylamino-propyl)-7-chloro-10,11-dihydro-5H-dibenz[b,f]azepin-10-ol, [5-(γ-dimethylamino-propyl)-7-chloro-10-hydroxy-10,11-dihydro-5H-dibenz[b,f]azepine] is obtained, which melts at 147–148°.

EXAMPLE 2

A solution of 59 g. of 5-(γ-dimethylaminopropyl)-5H-dibenz[b,f]azepin-10(11H)-one (B.P.$_{0.005}$ 174°) in 120 ml. of anhydrous ether is added drop by drop within 1 hour at 20° C. to 15.2 g. of lithium aluminum hydride in 500 ml. of anhydrous ether and then the mixture is refluxed for 18 hours. It is then cooled and water is carefully added drop by drop to decompose unconsumed hydride. The ether phase is removed, thoroughly washed with water and dried over potassium carbonate. By concentrating the solution, the 5-(γ-dimethylaminopropyl)-10,11-dihydro-5H-dibenz[b,f]azepin-10-ol, [5-(γ-dimethylaminopropyl)-10-hydroxy-10,11-dihydro-5H-dibenz[b,f]azepine] crystallizes out, M.P. 88–90°.

The following compounds are produced in an analogous manner:

5-(β-dimethylaminoethyl)-10,11-dihydro-5H-dibenz[b,f]azepin-10-ol, M.P. 86–87° from 5-(β-dimethylaminoethyl)-5H-dibenz[b,f]azepin-10(11H)-one, B.P.$_{0.001}$ 174–175°, M.P. 80°;

5-(γ-dimethylamino-β-methyl-propyl)-10,11-dihydro-5H-dibenz[b,f]azepin-10-ol, M.P. 138–140° from 5-(γ-dimethylamino-β-methyl-propyl-5H-dibenz[b,f]azepin-10(11H)-one, B.P.$_{0.015}$ 178°;

5-(γ-dimethylamino-propyl)-3-chloro-10,11-dihydro-5H-dibenz[b,f]azepin-10-ol from 5-(γ-dimethylamino-propyl)-3-chloro-5H-dibenz[b,f]azepin-10(11H)-one;

5-(γ-dimethylamino-propyl)-3,7-dichloro-10,11-dihydro-5H-dibenz[b,f]azepin-10-ol from 5-(γ-dimethylamino-propyl)-3,7-dichloro-5H-dibenz[b,f]azepin-10(11H)-one, M.P. 87°;

5-(γ-methylamino-propyl)-10,11-dihydro-5H-dibenz[b,f]azepin-10-ol from 5-(γ-methylamino-propyl)-5H-dibenz[b,f]azepin-10(11H)-one, B.P.$_{0.004}$ 175°, and 5-(β-methylaminoethyl)-10,11-dihydro-5H-dibenz[b,f]azepin-10-ol from 5-(β-methylamino-ethyl)-5H-dibenz[b,f]azepin-10(11H)-one.

EXAMPLE 3

29.4 g. of 5-(γ-dimethylamino-propyl)-5H-dibenz[b,f]azepin-10(11H)-one are dissolved in 300 ml. of methanol and 4.0 g. of sodium borohydride are added in small portions at 40 to 45°. The reaction mixture is kept for 14 hours at 40 to 50° and the major amount of the solvent is then evaporated in a rotary evaporator. The still liquid residue is poured into water and the separated oil is taken up in ether. The ether solution is washed with water, dried with sodium sulfate and evaporated, whereby 5-(γ-dimethylamino-propyl)-10,11-dihydro-5H-dibenz[b,f]azepin-10-ol crystallizes out, M.P. 88–90°.

EXAMPLE 4

*Manufacturing instructions for tablets containing 25 mg. of active substance*

To produce 1000 tablets each containing 25 mg. of 5-

(3'-dimethylamino-propyl) - 7 - chloro - 10,11 - dihydro-dibenz[b,f]azepin-10-ol, the following are used:

| (A) | Grams |
|---|---|
| The aforesaid active substance | 25.0 |
| Aerosil uncompressed | 5.0 |
| Potato starch dried | 17.7 |
| Lactose | 71.6 |

| (B) | |
|---|---|
| Polyvinylpyrrolidone | 4.0 |
| Glycerine, Ph. H.V. | 1.0 |
| Ethanol, pure q.s. about 50 ml. | |

| (C) | |
|---|---|
| Potato starch dried | 7.0 |
| Aerosil uncompressed | 1.0 |
| Talcum | 7.0 |
| Magnesium stearate | 0.7 |
|  | 140.0 |

To produce the powder mixture (A), first the uncompressed aerosil is mixed with the dried potato starch. The active substance is then added, the whole is mixed and then sieved through a sieve V (Ph. H.V.). Finally the lactose is added and the powder mixture (A) is sieved through a sieve V (Ph. H.V.).

This powder mixture is then evenly moistened with the granulating solution (B) and the mass is granulated through sieve IV (Ph. H.V.). It is dried at 30° for about 16 hours. The dried granulate is again sieved through sieve IV and then carefully mixed with the substances given under (C). The mass so prepared is then compressed into tablets of 7 mm. diameter each weighing 140 mg. and containing 25 mg. of active substance.

EXAMPLE 5

*Manufacturing instructions for the production of coated tablets each containing 25 mg. of active substance*

| (A) | Grams |
|---|---|
| Active substance used in Example 4 | 25.0 |
| Lactose | 14.8 |
| Aerosil uncompressed | 2.5 |

| (B) | |
|---|---|
| Stearic acid | 1.5 |
| Ethanol, pure q.s. | |

| (C) | |
|---|---|
| Potato starch dried | 4.0 |
| Talcum | 2.0 |
| Magnesium stearate | 0.2 |
|  | 50.0 |

The substances given under (A) are well mixed and moistened with the granulating solution (B). The mass so moistened is granulated through sieve No. 111–111a (Ph. H.V.: 0.75 cm. size aperture, 49–64 meshes per sq. cm.). The moist granulate is then dried for about 12 hours at about 20°. The dried granulate is again sieved through sieve No. 111–111a and then well mixed with the substances given under (C). The cores are then compressed. A core weighs 50 mg. and contains 25 mg. of active substance.

The dragées are then finished with coating solutions in the usual way. In this manner, dragées having a total (i.e. core+coating) weight of, e.g. 120 mg. and containing 25 mg. of active substance are obtained.

EXAMPLE 6

*Manufacturing instructions for the production of suppositories each containing 25 mg. of active substance*

| | |
|---|---|
| Active substance used in Example 4 _____g__ | 25.0 |
| Suppository mass (Witepsol H 12) (hydrogenated higher fatty acid glycerol esters) _____kg__ | 1.685 |

The active substance is passed through a sieve having 49–64 meshes per cm.² and mesh opening diameters of 0.75 cm. The suppository mass is heated to about 34° and is added in small batches to the active substance and intimately mixed therewith, then completely homogenized and finally the mixture having a temperature of about 32° is poured into suppository forms, 1000 suppositories being produced from the above amounts of materials. Each suppository thus weighs 1.710 g. and contains 25 mg. of active substance.

EXAMPLE 7

*Manufacturing instructions for the production of gelatine capsules*

| | Grams |
|---|---|
| Acitve substance used in Example 4 | 25.0 |
| Polyglycol 400 | 165.0 |

The active substance is sieved as described in the preceding example and is then suspended in the aforesaid polyglycol 400. The suspension is then filled into 1000 gelatine capsules, so that each capsule contains a filling of 165 mg. of polyglycol 400 and 25 mg. of active substance.

We claim:

1. A compound of the formula:

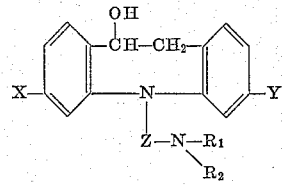

wherein
- each of X and Y is a member selected from the group consisting of hydrogen and chloro
- Z is alkylene of from 2 to 4 carbon atoms
- $R_1$ is a member selected from the group consisting of hydrogen and lower alkyl and
- $R_2$ is lower alkyl.

2. 5-(γ-dimethylamino-propyl) - 7 - chloro-10,11-dihydro-5H-dibenz[b,f]azepin-10-ol.

References Cited by the Examiner

UNITED STATES PATENTS

| 3,016,373 | 1/62 | Saggiomo et al. | 260—239 |
| 3,036,064 | 5/62 | Schindler | 260—239 |
| 3,068,222 | 12/62 | Craig | 260—239 |

FOREIGN PATENTS

| 222,655 | 8/62 | Austria. |

OTHER REFERENCES

Pulver et al.: Arzneimittel-Forschung, vol. 10, pages 530–3 (1960).

Costa et al.: Chem. Abstracts, vol. 55, page 11658 (1961).

Singh: Amer. Jour. Psychiatry, vol. 117, pages 360–361 (1960).

IRVING MARCUS, *Primary Examiner.*

NICHOLAS S. RIZZO, *Examiner.*